A. G. DAY.
Manufacture of Hard, Flexible Rubber.
No. 5,231. Reissued Jan. 14, 1873.
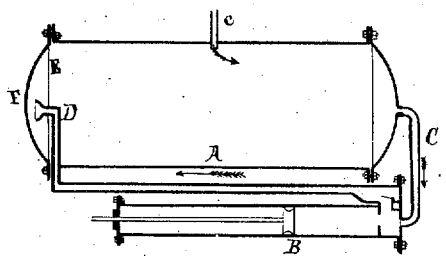
Witnesses:
F. B. Beecher
W. A. Weightman
Inventor.
Austin G. Day

UNITED STATES PATENT OFFICE.

AUSTIN G. DAY, OF NEW YORK, N. Y.

IMPROVEMENT IN THE MANUFACTURE OF HARD FLEXIBLE RUBBER.

Specification forming part of Letters Patent No. 21,122, dated August 10, 1858; reissue No. 620, dated November 9, 1858; extended seven years; reissue No. 5,231, dated January 14, 1873.

DIVISION B.

*To all whom it may concern:*

Be it known that I, AUSTIN G. DAY, formerly of Seymour, in the State of Connecticut, but now of the city, county, and State of New York, have invented a new and Improved Process or Method of Working what are usually denominated Hard-Rubber Compounds; and I hereby declare that the following is a full, clear, and exact description thereof.

The nature of my invention consists in a new and specific mode or process of treating sulphur and India rubber or caoutchouc, or other equivalent or vulcanizable gum, in such a manner as to make an artificial product which shall possess hardness, and also the properties of indestructibility, flexibility, and elasticity, thereby fitting it for many useful purposes in the arts to which no rubber compounds which were known previous to my invention were adapted.

It is well known that Charles Goodyear, on the 15th of June, 1844, patented a process of vulcanizing rubber so as to preserve it soft and flexible when exposed to the summer's sun or winter's cold, or to the action of various solvents; and that Nelson Goodyear, on the 6th of May, 1851, patented a process of manufacturing a "hard-rubber compound," which he correctly described in said patent as "a hard and inflexible substance hitherto unknown." The process of Charles Goodyear produced what is known in the arts as vulcanized "soft" rubber, and the process of Nelson Goodyear, described in his said 1851 patent, produced a vulcanized hard compound; but, as this hard compound is extremely brittle, and is also incapable of receiving the polish and finish requisite to adapt it to many purposes, it has never gone into use.

My improvement was originated after the invention of Nelson Goodyear, and is designed as an improvement upon the method devised by him of treating rubber combined with sulphur or other matters to produce hard compounds; and it consists in a specific mode or process of working India rubber, or other equivalent or vulcanizable gum combined with sulphur, in such a manner as to produce a compound which shall possess not only all the hardness of the Nelson Goodyear product, but also, in addition, the indispensable properties of flexibility and elasticity—qualities which cannot be imparted to it by Goodyear's process, but which are absolutely necessary to render it available for many purposes in the arts.

My said specific process differs from the process of Nelson Goodyear in nearly every one of the various elements of the treatment to which sulphur and India rubber, or other vulcanizable gum, must be subjected to produce hard compounds—that is to say, it differs, first, in the proportion of ingredients; second, in the degree of vulcanizing heat to which these ingredients are exposed; and, finally, in the nature and character of the resulting product. The Nelson Goodyear proportions of ingredients are from four to sixteen ounces of sulphur to sixteen ounces of rubber; but the 1851 patent states that a "better result will be obtained from" eight ounces of sulphur and eight ounces of some earthy base—magnesia, for example—to sixteen ounces of rubber. My proportions are one part, by weight, of sulphur to two parts, by weight, of rubber or other vulcanizable gum, and no earthy base whatever, for although an earthy base might be added, its addition will not improve the product. Nelson Goodyear's vulcanizing heat is prescribed in said patent as to commence below or at about 260°, and terminate at about 275° Fahrenheit. My vulcanizing heat is commenced at 275°, and is always carried many degrees beyond that point, frequently reaching to 300°, 305°, and 310° Fahrenheit, and sometimes higher; the length of time the compound requires to be treated depending greatly, as is well known, upon the temperature employed. Moreover, Goodyear's process merely contemplates subjecting his mixture of ingredients to the vulcanizing heat which he directs for the length of time which he prescribes, without any allusion whatever to the importance of what may be termed "heating intervals;"—or, in other words, the exposure of the ingredients to one degree of temperature for a certain interval of time, then to a higher degree for a certain other interval, and so on until the operation is completed; whereas I have found it in certain cases to be well-nigh indispensable to the production of a desirable result to observe such heating intervals. The mere statement of these differences between my method and that of Goodyear may seem sufficient; but their vital importance will be at once manifested when the results produced by the two processes are compared. Thus, if Goodyear's mixture be taken at sixteen ounces of sulphur to sixteen ounces of rubber, it may be exposed to the temperature which he directs for any length of time without producing anything but a soft semi-hard or leathery product, and, of course, therefore, such a mixture so treated is worthless for hard-rubber purposes; or, if his preferred mixture of eight ounces of sulphur and eight ounces of earthy base to sixteen ounces of rubber be adopted, and be exposed to the temperature which he directs for the "three to six hours" which he prescribes, the product will indeed be hard, but it will also be brittle and utterly destitute of the indispensable qualities of flexibility and elasticity, while if it be heated longer than six hours, it will be still more brittle and comparatively worthless. Finally, if to sixteen ounces of rubber and other proportions of sulphur between the extremes which Goodyear gives of four to sixteen ounces be selected, the proportion of ounces of earthy base to the rubber being increased or diminished according as such selected portion of sulphur is diminished or increased, as is directed in his patent, the results will range, according to the particular proportions chosen, between the soft or semi-hard product above and the brittle and comparatively worthless compound referred to; but by my process the results of merely "soft rubber" on the one hand, and of "hard rubber," which is brittle and comparatively worthless on the other hand, are alike avoided, and a product is made which is characterized by the qualities of ivory-like hardness, accompanied by the spring temper of steel, thereby furnishing precisely the properties which are found to be essential in the arts, and which are absolutely unknown to the Goodyear compound.

My invention, in fact, is based upon the chemical discovery which, so far as I am aware, I was the first to announce, that when a mixture composed of about two parts, by weight, of rubber or other vulcanizable gum and one part of sulphur, is exposed to a vulcanizing heat, commencing at about 275° Fahrenheit and carried to 300°, or upward, such a chemical change is produced in the compound that a hard ivory-like product will be formed, which will be tough, indestructible, and highly elastic. Hence the special method or process of treating sulphur combined with rubber or other gum in such a manner as to produce these results, together with the special compound or product possessing these properties when produced, constitute my invention, the said special product forming the subject of separate Letters Patent of even date herewith.

To enable others to put my improvements into use, I will describe the mode in which I have practiced them with success.

I take a convenient quantity of any suitable crude rubber, preferably the rubber of Para, or other vulcanizable gum, and combine sulphur with it in the usual manner, in the proportion of about one part, by weight, of sulphur to two parts, by weight, of rubber or other gum, and, after treating the compound in the way well known to manufacturers for preparing rubber compounds for vulcanization, I place the article or articles to be vulcanized in a suitable heater—if preferred, one in which the temperature is equalized in the manner hereinafter described—and I then let on the steam or other heat and run the temperature, preferably, directly up to 275° Fahrenheit, and from that point carry it to 300°, 305°, or 310°, or even higher, according to circumstances, the time during which the process is to be continued being easily determined by the operator, according to the mode adopted for applying the heat, and to the grade of result desired to be produced. I frequently make various changes in the length of time and degree of heat employed at the different steps of the process to adapt the temperature to different kinds of stock or different degrees of vulcanization, as required for different articles of manufacture.

It has been found, in the manufacture of hard-rubber and other gum compounds, that if vulcanization is performed in large heaters it is sometimes difficult to vulcanize equally in every part of the heater. Articles in one portion of the apparatus may be done too much or burned, while those of another part may be slack. These imperfections I am enabled to obviate, when required, by establishing a circulation in the heater which equalizes the temperature in every part of it. This may be accomplished by means of a double-acting pump, or a fan or other equivalent device, which shall draw out the steam from one end of the cylinder and transfer the same into the head of the opposite end, as seen in the drawing, where A represents the heating-cylinder, supplied with steam for heating it up under pressure by the tube *c*. The articles to be vulcanized are placed within A. The circulation to equalize the temperature in all parts is made by working the pump B, or its equivalent, which draws the steam from the C end of the heater, through valve *a*, and forces it through valve *b*, and thence through pipe D, whence it strikes against head F, and is distributed through the perforated plate E, and so through the body of the cylinder.

It is evident that a single-acting pump, or a double-acting pump, or a rotary pump, or a forcing and exhausting fan, may be used for this purpose.

I do not now claim any special form of apparatus, for a variety of known apparatus might be used to accomplish the effect. Even a current of steam forced in at one end and out at the other would also aid in keeping up the circulation and tend to equalize the heat, but very imperfectly. The novelty consists in the making an artificial circulation in a vulcanizing apparatus, irrespective of the special means employed for that purpose.

I do not claim, in the broad, vulcanizing sulphur and rubber or other equivalent gums, irrespective of the special process used and the special product made; but

What I claim as my invention, and desire to secure by Letters Patent, is—

1. The herein-described special process of producing vulcanized hard compounds which possess the properties of flexibility and elasticity, as set forth, by vulcanizing in any suitable apparatus a mixture composed of two parts, by weight, of India rubber or other vulcanizable gum, and one part, by weight, of sulphur, at a temperature commenced at or about 275° Fahrenheit and carried to the degrees of temperature hereinabove mentioned, substantially in the manner and with the result herein described.

2. A heater or vulcanizing apparatus in which the temperature is equalized, substantially in the manner and for the purpose set forth.

AUSTIN G. DAY.

Witnesses:
T. B. BEECHER,
W. H. WEIGHTMAN.